Patented Jan. 6, 1925.

1,521,953

UNITED STATES PATENT OFFICE.

HANS MARCUSSEN HØYBERG, OF FREDERIKSBERG, NEAR COPENHAGEN, DENMARK, ASSIGNOR TO THE HOYBERG COMPANY A/S, OF COPENHAGEN, DENMARK, A CORPORATION.

METHOD OF ASCERTAINING THE QUANTITY OF FAT IN MILK AND CREAM.

No Drawing. Application filed June 26, 1924. Serial No. 722,567.

*To all whom it may concern:*

Be it known that I, HANS MARCUSSEN HØYBERG, a subject of the King of Denmark, residing at Rathsacksvej 9, Frederiksberg, near Copenhagen, Denmark, have invented new and useful Improvements in Methods of Ascertaining the Quantity of Fat in Milk and Cream; and I do hereby declare the following to be a full, clear, and exact description of the same.

For the volumetric estimation of fat in milk or cream there is generally used a combination of various liquids which are mixed with a measured volume of the milk or cream in a butyrometer and are for the purpose of dissolving the casein and breaking the emulsion, whereby the liberated fat particles can flow together in molten state to form a single body of fat, the volume of which is then read off on the divisions on the measuring tube of the butyrometer. For dissolving the protein substances there are used acids or alkalies, and for breaking of the emulsion there is used a higher alcohol such as propyl or amyl alcohol. When alkaline solutions have been used it has hitherto been deemed necessary that the liquid should contain a tartrate in order to keep the phosphates of the milk in solution.

According to the present invention the entire process can be carried out by means of a single alkaline solution, without the use of the expensive tartrates or similar salts. The solution used contains, besides sodium or potassium hydroxide, a higher alcohol (propyl or amyl alcohol) and a lower alcohol (methyl or ethyl alcohol), the latter serving to keep the former in solution. Solutions of this composition, when protected against the carbon dioxide of the air, may be preserved easily and are stable, giving exceedingly exact results in a short time without the use of a centrifugal machine which has been necessary in most other methods for quickly estimating fat in milk.

The preferred composition of the solution in question is the following:—

| | Volumes. |
|---|---|
| Ordinary fermentation amyl alcohol (boiling point 112–132° C.) | 8 |
| Ethyl alcohol (96 per cent strength) | 30 |
| Sodium hydroxide solution (30 per cent strength) | 15 |
| Water | 30 |

This mixture can also be used for estimating fat in cream; in this case it is, however, preferable to reduce the quantity of amyl alcohol to 8 volumes.

When the quantity of fat in milk is to be estimated, 8.7 c. c. of milk are measured into a butyrometer glass and 4.85 c. c. of the above solution are added. The butyrometer is then closed by a rubber stopper in the usual manner and the liquid and the milk are mixed by turning the butyrometer upside down several times and shaking vigorously during about one minute. The butyrometer is then placed in a water bath at a temperature of about 65° C., the stopper being turned upwards. After five minutes the butyrometer is shaken vigorously during about ½ minute, and then replaced in the water bath, this time with the stopper turned downwards. After about 15 minutes the butyrometer is removed from the bath and the quantity of fat read off in the usual way.

An estimation of fat in cream can be carried out in the same manner, 4.5 c. c. of cream and 4 c. c. of the above solution being used. The quantity of fat may be read off 10 minutes after the butyrometer has been placed in the water bath for the second time.

Although the above indicated quantities of the substances have given the best results, some variations can be made with good results. Thus the quantity of amyl alcohol can be varied somewhat, 4 volumes being the lower and 18 volumes the higher limit, and the quantity of sodium hydroxide can in similar manner be varied within the limits of 6 and 25 volumes. Methyl alcohol may be in part substituted for the ethyl alcohol which serves for keeping the amyl alcohol in solution, and instead of sodium hydroxide the equivalent amount of potassium hydroxide can be used.

Having thus fully described my invention I claim as new and desire to secure by Letters Patent:

1. Method of ascertaining the quantity of fat in milk and cream, consisting in mixing milk or cream with a single solution containing a higher alcohol, a lower alcohol, an alkali-metal hydroxide, and leaving the mixture in a butyrometer glass in a water bath until the fat has formed a single body and can be read off.

2. An aqueous solution for use in estimation of the percentage of fat in milk or cream consisting of 4 to 18 volumes of amyl alcohol, 30 volumes of ethyl alcohol, 6 to 25 volumes of an alkali-metal hydroxide solution of 30 percent strength, and 30 volumes of water.

In testimony whereof I have affixed my signature in presence of two witnesses.

HANS MARCUSSEN HØYBERG.

Witnesses:
 CECIL V. SCHON,
 VIGGO BLOM.